United States Patent
Burnham (10) Patent No.: US 8,618,687 B2
(45) Date of Patent: Dec. 31, 2013

(54) WATER INLET GENERATOR

(76) Inventor: Douglas Burnham, Leeds (GB)

(*) Notice: Subject to any disclaimer, the term of this patent is extended or adjusted under 35 U.S.C. 154(b) by 282 days.

(21) Appl. No.: 12/918,387

(22) PCT Filed: Feb. 20, 2009

(86) PCT No.: PCT/GB2009/050168
§ 371 (c)(1),
(2), (4) Date: Sep. 30, 2010

(87) PCT Pub. No.: WO2009/104020
PCT Pub. Date: Aug. 27, 2009

(65) Prior Publication Data
US 2011/0012356 A1    Jan. 20, 2011

Related U.S. Application Data

(60) Provisional application No. 61/031,028, filed on Feb. 25, 2008.

(30) Foreign Application Priority Data

Feb. 22, 2008    (GB) .................................. 0803251.8

(51) Int. Cl.
*F21S 8/00*    (2006.01)
(52) U.S. Cl.
USPC .......................................... 290/54; 416/179
(58) Field of Classification Search
USPC .......................................................... 290/52
See application file for complete search history.

(56) References Cited

U.S. PATENT DOCUMENTS

| | | | | |
|---|---|---|---|---|
| 1,836,860 A | * | 12/1931 | Moody | 415/130 |
| 2,436,683 A | * | 2/1948 | Wood, Jr. | 290/52 |
| 2,658,455 A | * | 11/1953 | Seinfeld | 416/181 |
| 3,028,140 A | * | 4/1962 | Lage | 416/188 |
| 3,750,001 A | * | 7/1973 | McCloskey | 322/35 |
| 3,845,291 A | | 10/1974 | Portyrata | |
| 4,246,753 A | * | 1/1981 | Redmond | 60/398 |
| 4,352,025 A | * | 9/1982 | Troyen | 290/54 |
| 4,564,889 A | * | 1/1986 | Bolson | 362/192 |
| 4,616,298 A | | 10/1986 | Bolson | |
| 4,784,574 A | * | 11/1988 | Tsuno et al. | 416/241 B |
| 5,140,254 A | * | 8/1992 | Katzman | 322/35 |
| 5,228,964 A | * | 7/1993 | Middleby | 204/194 |
| 5,580,438 A | * | 12/1996 | Silveri | 205/687 |
| 5,846,055 A | * | 12/1998 | Brodersen et al. | 415/206 |
| 6,036,333 A | * | 3/2000 | Spiller | 362/192 |

(Continued)

FOREIGN PATENT DOCUMENTS

AU    649515 B2    5/1994
JP    10159882 A   *  6/1998

OTHER PUBLICATIONS

International Search Report carried out by the European Patent Office dated May 15, 2009 for International Application No. PCT/GB2009/050168.

*Primary Examiner* — Joseph Waks
(74) *Attorney, Agent, or Firm* — Shumaker, Loop & Kendrick, LLP (57) ABSTRACT

A swimming pool water inlet generator operable to allow the generator to be attached to a swimming pool water inlet, a turbine assembly arranged and operable to generate electricity when water flows through the inlet and at least one electrically powered device operable to use the generated electricity in the operation thereof.

22 Claims, 6 Drawing Sheets

(56) References Cited

U.S. PATENT DOCUMENTS

| | | | |
|---|---|---|---|
| 6,559,553 B2 * | 5/2003 | Yumita et al. | 290/54 |
| 6,765,308 B1 * | 7/2004 | Kazanjian et al. | 290/43 |
| 6,798,080 B1 * | 9/2004 | Baarman et al. | 290/43 |
| 6,801,003 B2 * | 10/2004 | Schanberger et al. | 315/291 |
| 7,036,951 B2 * | 5/2006 | St-Hilaire | 362/101 |
| 7,357,599 B2 * | 4/2008 | Cripps | 405/75 |
| 7,398,138 B2 * | 7/2008 | Emery et al. | 700/283 |
| 7,768,146 B2 * | 8/2010 | Balzano | 290/54 |
| 8,092,675 B2 * | 1/2012 | Kennedy | 210/167.11 |
| 2003/0137258 A1 | 7/2003 | Piepgras et al. | |
| 2005/0180127 A1 * | 8/2005 | St-Hilaire | 362/101 |
| 2006/0175423 A1 * | 8/2006 | White et al. | 239/18 |
| 2009/0188788 A1 * | 7/2009 | Habif et al. | 204/228.3 |

\* cited by examiner

WATER INLET GENERATOR

TECHNICAL FIELD AND BACKGROUND OF THE INVENTION

The present invention relates to a generator, particularly to a swimming pool water inlet/outlet generator, a kit for retrofitting such a generator to a swimming pool water inlet/outlet and a method of generation.

It is known to provide electrical devices in and around swimming pools. For example, it is known to provide submerged lighting devices to illuminate the water and provide a decorative effect as well as an increased safety aspect.

A problem with the provision of electrical devices in and around swimming pools lies in the provision of a supply of electricity. Health and safety concerns are paramount were water and electricity are used in such proximity meaning that the electricity supply must be very carefully installed using various water tight components. This can be time consuming and expensive.

Swimming pools require that the water therein is treated to prevent the build up of bacteria and algae. Such water treatment is often achieved by pumping an amount of swimming pool water from the pool through a water treatment facility, which may be remote from the swimming pool, before returning the treated water to the pool.

SUMMARY OF THE INVENTION

It is an object of aspects of the present invention to address the above mentioned problems and to provide one or more solutions.

According to a first aspect of the present invention there is provided a swimming pool water inlet generator comprising attachment means operable to allow the generator to be attached to a swimming pool water inlet, a turbine assembly arranged and operable to generate electricity when water flows through the inlet and at least one electrically powered device operable to use the generated electricity in the operation thereof.

In one embodiment, the electrically powered device may be removably attachable to the generator. In such a scenario, the electrically powered device may be operable to draw power from the generator by means of a plug and socket arrangement, which may be via inductive coupling, for example, or by other means of charge transfer. The electrically powered device may be secured to the generator via securing means, such as clips, for example.

Accordingly, according to a further aspect of the present invention there is provided a swimming pool water inlet generator assembly, the assembly comprising, a turbine assembly arranged and operable to generate electricity when water flows therethrough, the turbine assembly being in electrical communication with at least one electrically powered device, the electrically powered device being operable to use the generated electricity in the operation thereof.

The invention also extends to a turbine assembly comprising one or more coupling means, being operable to allow the turbine assembly to be in electrical communication with one or more electrically powered device; and, separately, to an electrically powered device comprising coupling means operable to allow the electrically controlled device to be in electrical communication with a turbine assembly.

By the term "in electrical communication" it is meant that electrical charge generated by the generator is able to be transferred to the electrically powered device.

Preferably, the attachment means is operable to allow the generator to attach to an insert of a swimming pool water inlet. Preferably, the attachment means comprises a threaded region operable to threadedly engage with a threaded region of the swimming pool water inlet.

The generator may further comprise locking means operable to allow the generator to be locked in position with respect to the swimming pool water inlet. Preferably, the locking means prevent the attachment means becoming unattached.

The turbine assembly may comprise a rotor, which may be arranged to rotate when water flows through the swimming pool water inlet. The axis of rotation of the rotor may be generally parallel with the direction of flow of the water through the swimming pool water inlet. Alternatively, the axis of rotation of the rotor may be generally perpendicular with the direction of flow of the water through the swimming pool water inlet. The rotor may be generally conical, preferably having an apex thereof extending into the swimming pool water inlet. The rotor may comprise a generally flat underside, which may be circular in shape. Toward an edge or edges of an underside of the rotor may be located one or more magnets. The rotor may be arranged on a shaft. The rotor may be free to rotate about the shaft. The rotor may comprise one or more rotor blades or vanes. The blade profiles of the rotor may be different to each other or may be variable. The rotor blades or vanes may be configured such that water exiting the rotor is directed tangentially to the direction of rotation, thus preferably, the exit of water out of the rotor serves to give further propulsion to the rotor. Preferably, the rotor blades or vanes are curved.

The turbine assembly may comprise a braking system which may be operable to allow the rotor to be locked in position and thus rotation thereof to be prevented. In one embodiment, such a braking system may comprise a rod, operable to extend between the rotor and the static portion to thereby lock the two together. The braking system may be manually locally controllable or by means of a remote control.

Alternatively or additionally, the generator may comprise diverting means operable to selectively divert water into or away from the rotor of the turbine assembly.

The turbine assembly may comprise a static portion, upon which may be situated one or more stators. The stators may be arranged on the static portion to correspond with the position of the one or more magnets on the rotor.

The static portion may further comprise one or more electronic components associated with the turbine assembly, such components include: batteries; battery control units; generator control units; master control units etc.

Preferably, the static portion is generally water tight. Such water tightness may be achieved by rubber seals etc.

The at least one electrically powered device may be fitted to the static portion of the turbine assembly.

The electrically powered device may be selected from one or more of the following: a light source; an ionizer; a water heating element; a water cooling element; a salt generator. The electrically powered device preferably comprises a light source, such as an LED or an array of LEDs, but other known light sources are also included within the scope of the invention. The light source may be arranged to provide colour changing lighting effects. Other electrically controlled devices as discussed herein may be used and many further possible electrically controlled devices would be well known and appreciated to a person skilled in the art and are within the scope of the present invention.

The generator may comprise one or more status indicators. The status indicators may be visible or audible. For example, the generator may comprise a light source which illuminates to indicate ready status or poor battery status, for example.

Cooling means may be provided to cool elements where required. For example, a heat sink may be provided to cool LEDs, which may function as a heat exchange between the hot component and the relatively cool pool water.

The generator may comprise flow restriction means, which may be a flow restriction member. The flow restriction means may be arranged to restrict the flow of fluid through the inlet, thereby, preferably being operable to cause acceleration of fluid into the turbine assembly.

In a preferred embodiment, the flow restriction member is removably attachable to the generator.

Advantageously, a user may regulate the flow of fluid into the turbine assembly to thereby maximise the efficiency of the generator by attaching the flow restriction member.

The flow restriction means may be expandable. The expandable flow restriction means may comprise spring and/or lever arrangements and may be operable to expand/contract as a function of rotational speed of the turbine. For example, the expandable flow restriction means may use centrifugal force to expand/contract.

The generator may comprise exhaust direction means, operable to direct the flow of exhaust fluid, the fluid having exited the rotor. The exhaust direction means may comprise a channel or conduit. The exhaust direction means may direct the flow of exhausted fluids to a directionally adjustable outlet.

The generator may comprise a cover portion which may be transparent, translucent or opaque.

The generator may comprise signal detecting means operable to detect a signal from a remote control device.

The generator may comprise light detection means operable to detect levels of light at or around the generator. The light detection means may be arranged to cause the operation of one or more of the electronically powered devices depending on the detected light levels. For example, the light detection means may be arranged to turn an electrically powered light of the generator on when low light is detected, and/or to turn a water heating element on when a high light level is detected etc.

The generator may comprise switching means operable to switch the or each electrically powered device between an on and off position. The switching means may one or more comprise manual switches. The switching means may operate remotely, for example by operation of a remote control unit. The switching means may comprise a timer which may allow the or each (separately or together) electrically powered devices to be switched on or off at a predetermined time. The timer may be programmable, preferably by a remote control unit.

Reference herein to a swimming pool water inlet should be understood as reference to an inlet or outlet, that is, an orifice that allows water into or out of a swimming pool. However, in a preferred embodiment, a swimming pool water inlet should be understood as an orifice that allows water into a swimming pool.

The present invention extends to a submergible swimming pool light which is attachable to a swimming pool water inlet, the light comprising an integral electricity generator to power the said light.

According to a further aspect of the present invention there is provided a swimming pool water inlet generator assembly, the assembly comprising a swimming pool water inlet having attached thereto a swimming pool water inlet generator comprising attachment means operable to allow the generator to be attached to a swimming pool water inlet, a turbine assembly arranged and operable to generate electricity when water flows through the inlet and at least one electrically powered device operable to use the generated electricity in the operation thereof.

The assembly may comprise flow restriction means.

According to a further aspect of the present invention there is provided a method of generation, the method comprising arranging a swimming pool water inlet generator about a swimming pool water inlet such that water passing through the said inlet is caused to enter a turbine assembly of the swimming pool water inlet generator causing the generation of electricity, which electricity may be used to power at least one electrically powered device of the swimming pool water inlet generator.

The method may comprise restricting the flow of fluid into the generator with flow restriction means.

According to a further aspect of the present invention there is provided a method of attaching a swimming pool water inlet generator to a swimming pool water inlet, the method comprising using attachment means of the swimming pool water inlet generator to attach the generator to the swimming pool water inlet, and arranging a turbine assembly of the generator relative to the swimming pool water inlet such that water passing through the inlet enters the turbine assembly.

Other optional features/uses of the generator device are as follows. The generator could be used in swimming pools (indoor or outdoor), spas, lakes or fountains.

The generator may comprise flow detection means operable to detect a flow of fluid through the inlet. The flow detection means may operate by monitoring the voltage output of the generator. Such a function may be used to inhibit or regulate water treatment function, for example, to prevent inappropriate device operation.

The generator may comprise water testing means. For example, probes arranged to be exposed to the water (proximal to the turbine, for example) may be operable to communicate with the auxiliary devices various parameters of the water. For example, parameters such as chlorine content etc. could be monitored and relayed to auxiliary devices (such as a water treatment facility). The generator could comprise temperature sensing means to measure the temperature of the pool water through the inlet. Further, the generator could be arranged to illuminate different lights depending on the temperature of the water through the generator.

The generator may comprise an alarm facility. The alarm facility may comprise sensors or cameras to detect people present in the pool. Upon detection of unauthorised swimmers, a signal could be sent to an auxiliary source (such as an audible alarm). Alternatively or additionally, in an alarm condition, the generator could be arranged to trigger an alarm lighting condition (flashing red LEDs for example).

The pool inlet could project out of the body of water. For example, the inlet could be a fountain head. The generator may comprise one or more outlet to allow the water to flow out of the generator. The outlet may comprise numerous apertures and may independently be directionally adjustable.

BRIEF DESCRIPTION OF THE FIGURES

All of the features disclosed herein may be combined with any of the above aspects in any combination.

For a better understanding of the invention, and to show how embodiments of the same may be carried into effect, reference will now be made, by way of example, to the accompanying diagrammatic drawings in which.

DETAILED DESCRIPTION OF THE INVENTION

Figure 1:
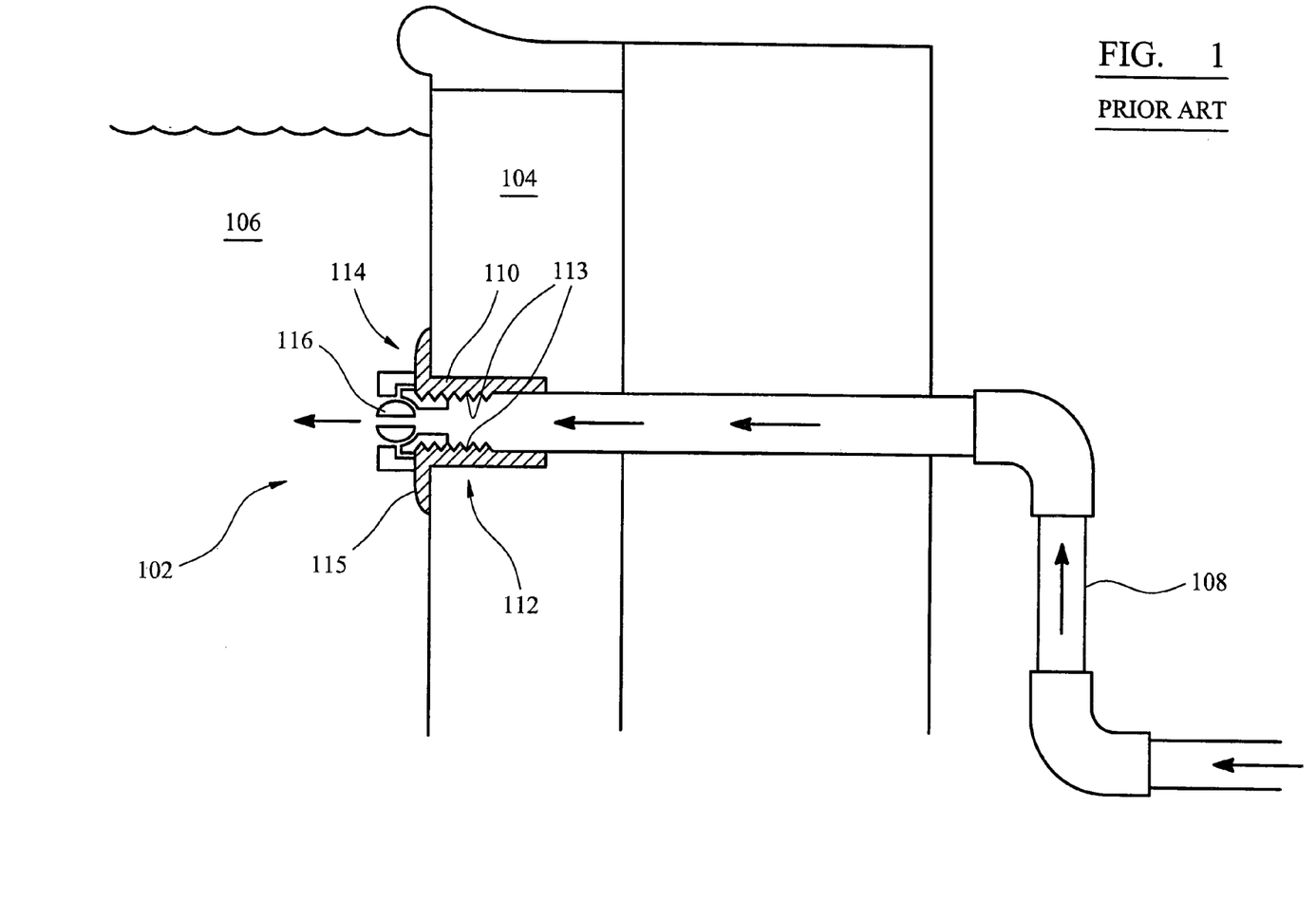
FIG. 1 shows a cross sectional view of a prior art swimming pool water inlet.

Referring first to FIG. 1 there is shown a swimming pool water inlet 102 of the prior art. The water inlet is in the wall 104 of a swimming pool 106 at a submerged position. The water inlet 102 is connected to a water treatment facility (not shown) via a conduit 108. The arrows in the conduit show the direction of water flow therethrough. At the junction between the conduit 108 and the wall 108 is an insert 110 which has an interior portion 112 and an exterior portion 114. The interior portion 112 is tubular and extends into an aperture in the pool wall 104. Attached to an end of the interior portion 112 is an exterior portion 114 which comprises a flange 115 which abuts the outer surface of the wall 104. The insert 110 has an internal thread 113 therein to allow devices to be attached thereto. One such device is a diffuser 116, as shown in FIG. 1. The diffuser serves two purposes in that it restricts the flow of water through the inlet, thus increasing the back pressure in the system (which is necessary for some pool apparatus, such as some pressure sensing heat controls, for example) and it directs and diffuses water entering the pool.

Figure 2:
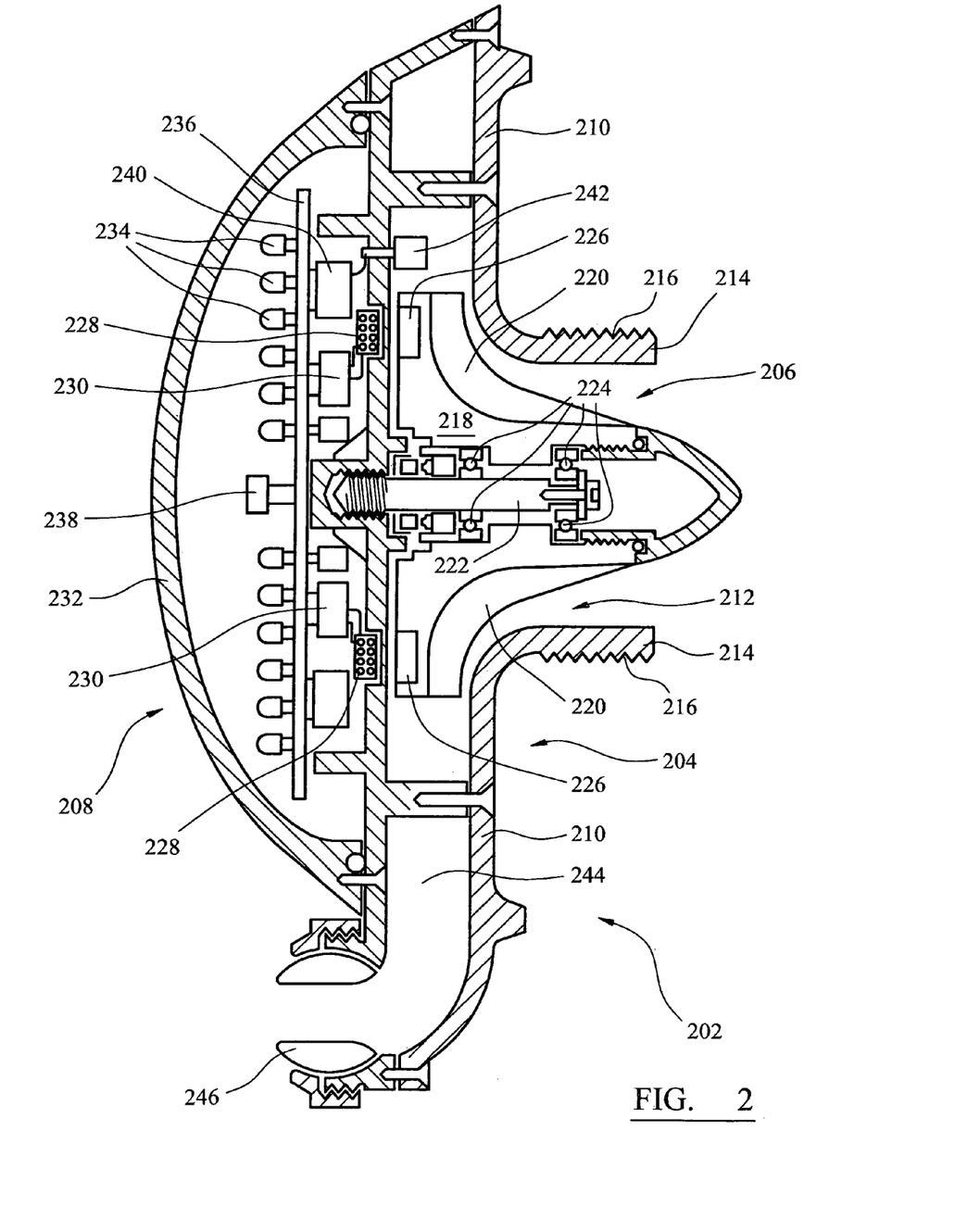
FIG. 2 shows a cross sectional view of a swimming pool inlet generator device of the present invention.

Referring now to FIG. 2 there is shown a swimming pool inlet generator device 202 of the present invention. The generator 202 comprises a rear portion 204 adapted to be screwed into an insert (such as insert 110, described above), a turbine assembly 206 and a display portion 208.

The rear portion 204 comprises a generally circular plate 210 having a circular aperture 212 at the diametric centre thereof. Extending axially from the circumferential edge of the aperture 212 is a short tube 214 having an external threaded portion 216. The external thread allows the device to be screwed into an insert (such as the insert 110) as will be described below in relation to FIG. 3.

Attached to a front face of the rear portion 204 is the display portion 208, which houses the turbine assembly 206. The turbine assembly 206 comprises a rotatable rotor 218, operable to rotate under a flow of water therethrough. The rotor 218 comprises rotor blades 220 and is mounted on, and arranged to freely rotate with respect to, a shaft 222 via bearings 224. The rotor 218 is generally bell shaped having a flat underside and tapering up to an apex distal to the display portion 208. Mounted in the flat underside of the rotor 218 are magnets 226. Arranged opposite the magnets 226 in the stationary housing of the display portion are stators 228 connected to batteries 230. Rotation of the rotor 218 causes rotation of the magnets 226 relative to the stators 228, thus the device form an electricity generator, providing electricity to charge the batteries 230 in a manner well known in the art.

The display portion 208 comprises an outwardly facing transparent domed cover 232, which covers an array of LEDs 234 attached to a board 236. The LEDs draw power from the batteries 230 to produce light, when required. The board 236 also houses a sensor 238, operable to receive a signal from a remote control device to thereby control the LEDs and other electrical devices, such as an ioniser (shown in FIG. 2 as 240 ioniser control and 242 ioniser electrodes). The device 202 is also fitted with usual components to enable the electrical generation such as generator control, battery control and master control.

The device 202 further comprises a conduit 244 leading from the rotor to a diffuser 246 at a position below the display portion 208 which allows water to enter the pool (not shown) in the usual manner similar to that described above in relation to FIG. 1.

In use, the device is fitted to a swimming pool inlet (as will be described hereunder with relation to FIG. 3). Water flowing through the inlet into the pool turns the rotor, thus operating the turbine assembly and generating electricity. The electricity generated can be stored in batteries 230 and used to power supplementary devices such as a light source (the LEDs 234) or an ioniser 240, 242. The supplementary devices may be used while the electricity is being generated or at a subsequent time. The device is further provided with a transmitter/receiver to allow it to be controlled remotely using a remote control unit (not shown).

Figure 3:
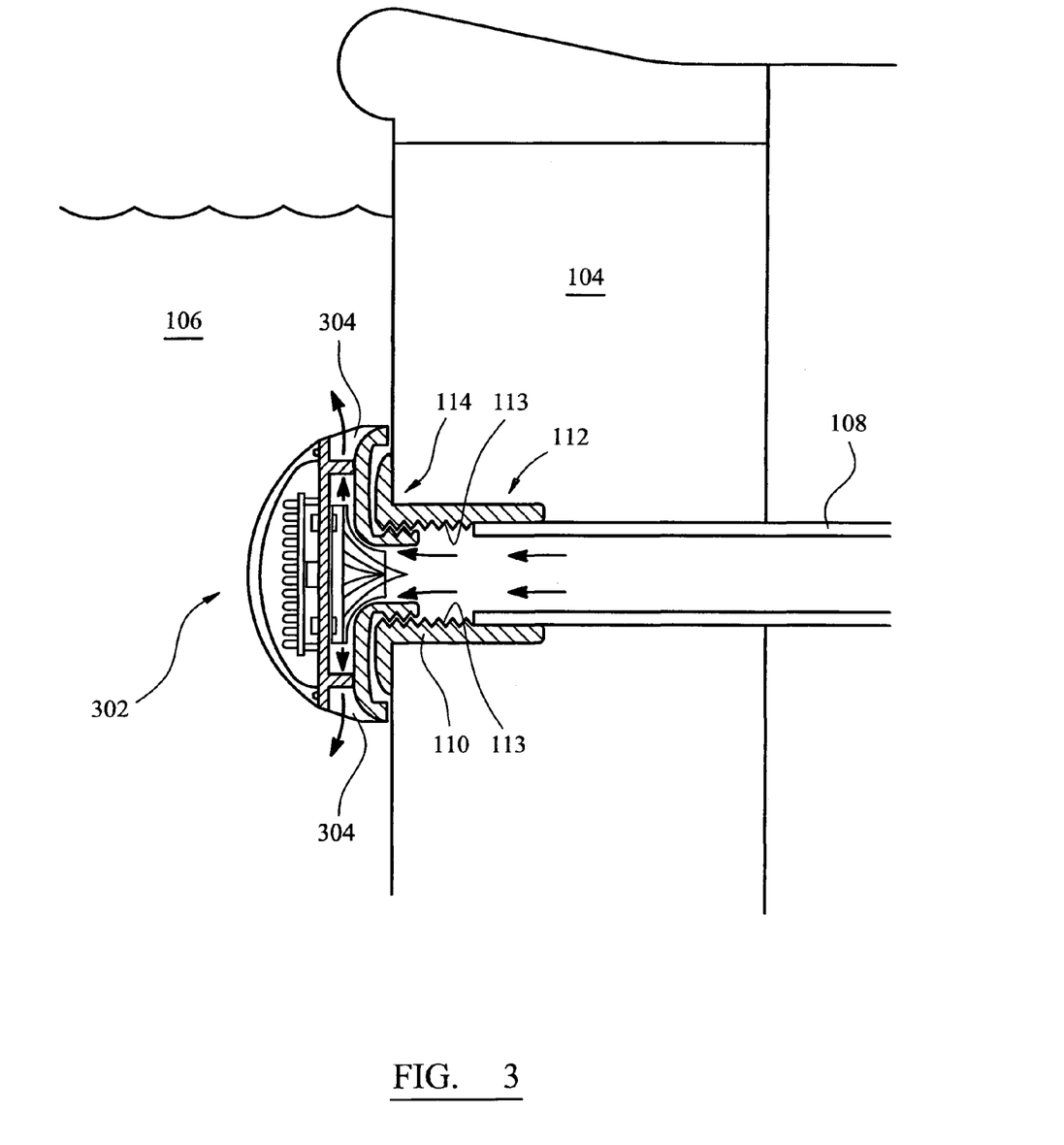
FIG. 3 shows an alternative embodiment of the device of FIG. 2 attached to a swimming pool water inlet.

Referring now to FIG. 3 there is shown a further embodiment of a generator device 302 attached to a swimming pool water inlet. As can be clearly seen in FIG. 3, the device 302 screws into an internal thread of an insert 110 as described above in relation to FIG. 1. The arrows in FIG. 2 show the flow of water through the conduit 108, through the device 302 and out into the pool 106. The device 302 is the same as the device 202 except that instead of having a conduit and diffuser arrangement as per the conduit 244 and diffuser 246 of FIG. 2, the water is allowed out into the pool 106 via apertures in the device 304, as shown by the arrows in FIG. 3.

Figure 4:
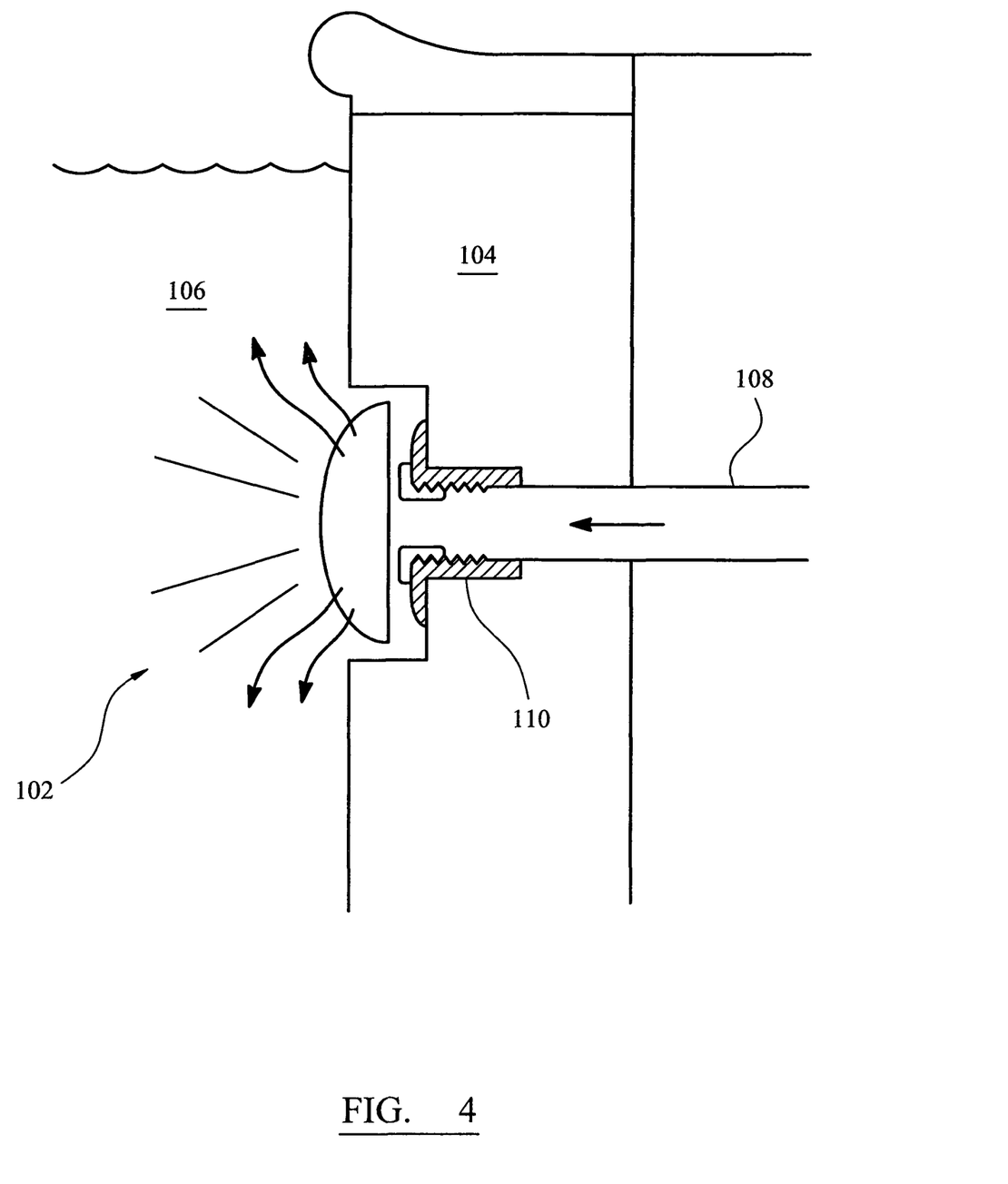
FIG. 4 shows an alternate manner of fitting the generator device of FIG. 3 to a swimming pool water inlet.

FIG. 4 shows the device 302 attached to a swimming pool in a recessed manner, so that the cover portion is generally flush with the walls 104 of the pool.

Figure 5:
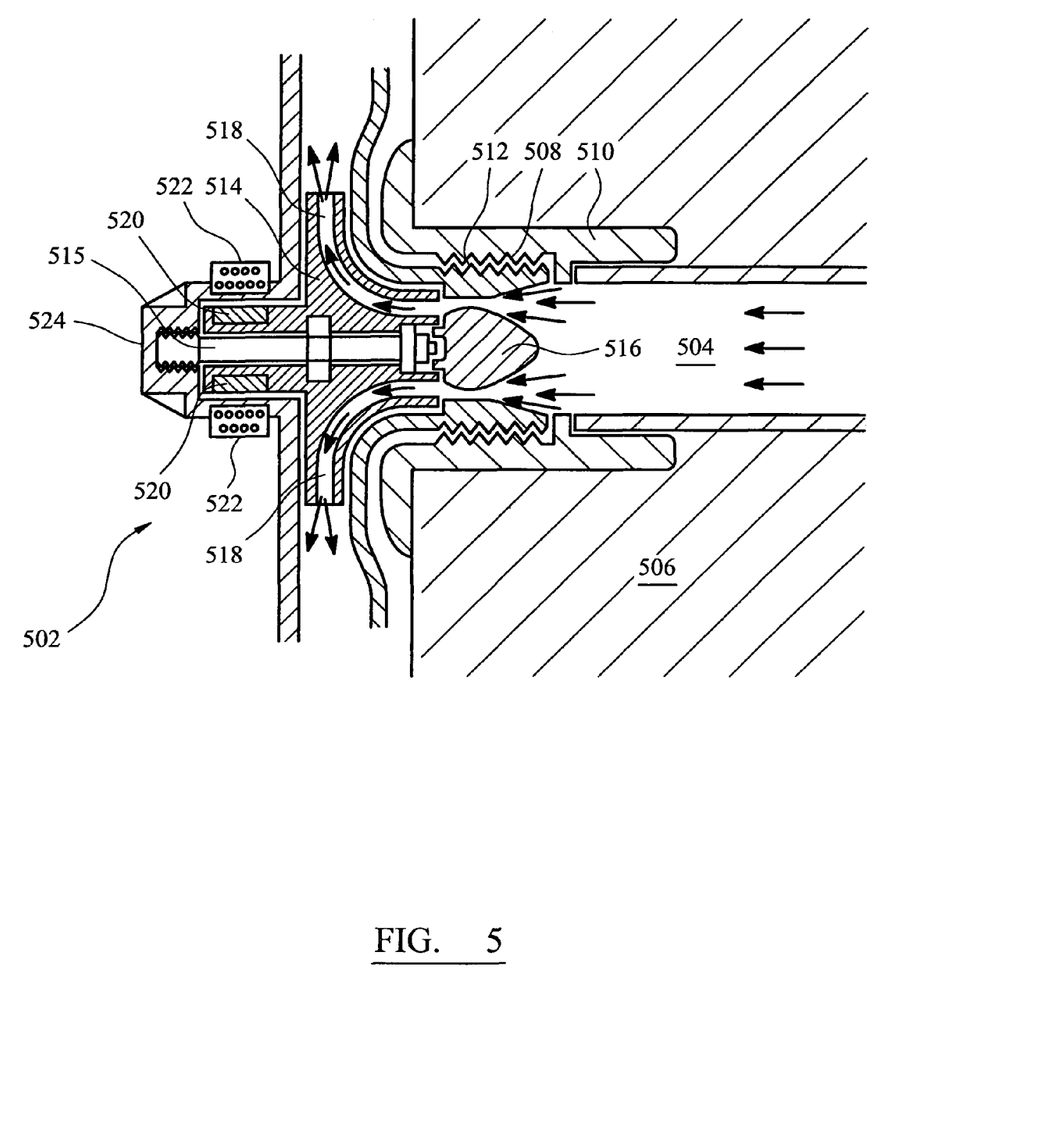
FIG. 5 shows a cross sectional view of a further embodiment of a swimming pool inlet generator device of the present invention.

FIG. 5 shows a further embodiment of a swimming pool inlet generator device 502 fixed to a swimming pool inlet 504, in the wall 506 of a swimming pool via cooperating threads, one thread 508 being on an outer wall of standard swimming pool inlet insert 510, the other thread 512 projecting from a rear side of the device 502. For simplicity, parts of the device have been omitted from FIG. 5. For example, FIG. 5 does not show any electricity storage means, such as a battery or capacitor. Also, the device displayed in FIG. 5 does not show an associated electrically powered device, but such a device (ie. a light, for example) would normally be fitted. Other optional features as discussed herein may also be used with this embodiment of the device.

The device 502 comprises a rotatable rotor 514, which is mounted on a rotatable shaft 515, the rotor 514 extends into the swimming pool inlet 504 and has, affixed to an end thereof that extends into the inlet, a flow regulating member 516. The flow regulating member 516 is generally egg shaped and regulates the flow of fluid into the rotor 514 by creating an obstruction in the inlet 504. The operation of the flow regulating member 516 will be discussed in more detail hereunder.

The rotatable rotor 514 is operable to rotate by the flow of fluid passing therethrough, as discussed above in relation to the first embodiment. In more detail, the rotor 514 comprises shrouded conduits 518 that allow the flow of fluid therethrough.

At a side of the device 502 distal to the inlet 504 is a magnet/stator arrangement to form the turbine. The magnets 520 are arranged circumferentially around the shaft 515 toward an end thereof distal to the flow regulating member 516, while the stator windings 522 are arranged in a circumferential housing 524 and generally surround the magnets 520. The housing 524 is static, in use, while the magnets, being fixed to the shaft 515, rotate, when in use.

Different swimming pools may have different powered circulation pumps, different numbers of inlets, and probably both. For this reason, the flow of water through the inlet 504 can differ widely between different swimming pools. For this reason, it is important to be able regulate the flow at the generator device to ensure that the rotor is turning at an efficient rate to generate sufficient electricity. A flow regulating member 516 is operable to address this issue by restricting or allowing the flow of water into the conduits 518. As shown in FIG. 5, the flow regulating member restricts the flow of fluid into the conduits 518, thereby causing the fluid to accelerate and thus the rotor to spin faster. In this manner, the efficiency of the generator 502 is increased.

The flow regulating device 516 is a removable object and it is envisaged that a user, who may be a swimming pool engineer, may carry several flow regulating devices of differing sizes to maximise the efficiency of the generator depending on the flow rate through the inlet in question.

Figure 6:
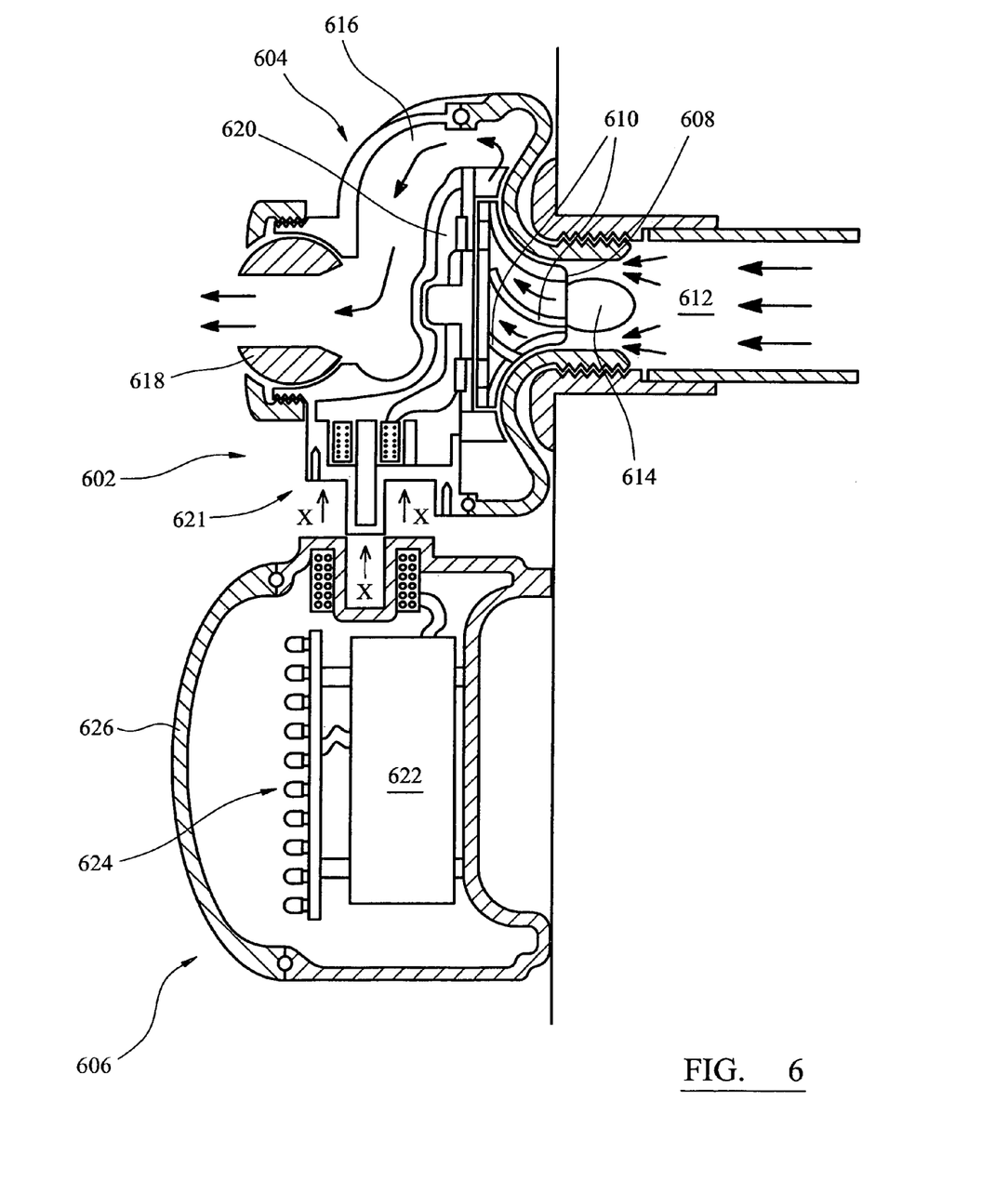
FIG. 6 shows a partial sectional view of a third embodiment of a swimming pool inlet generator device having a separately attachable lighting module.

Referring now to FIG. 6 there is shown a third embodiment of a swimming pool generator device 602 of the present invention. The device 602 comprises a generator unit 604 and a removably attachable electrically powered device unit 606, being a light.

The generator unit 604 is similar to that described above in relation to FIGS. 2 and 5 and comprises a rotatable rotor 608 having curved rotor blades 610. Extending into a swimming pool inlet 612 is a flow restriction member 614, being similar in form and function to that described above in relation to FIG. 5. The generator unit 604 also comprises an outlet unit 616. The rotor 608 is designed to direct exhausted fluid (water) into the outlet unit 616, which then channels the water through a directionally adjustable outlet 618. The magnet and stator arrangement 620 of the unit 604 is similar to that described above in relation to FIG. 2.

Toward a lower portion of the unit 604 is a plug arrangement 621, operable to allow a electrically powered device module to be plugged thereon, such as the electrically powered device module 606, being a lighting module. The lighting module 606 comprises a battery and control sensors 622, an LED lighting array 624 situated behind a lens 626. The interface between the generator unit 604 and the lighting module 606 (a plug and socket arrangement) in the present embodiment comprises an inductive coupling arrangement operable to transfer charge from the generator unit 604 to the lighting unit 606 (and ultimately to the battery 622). The inductive coupling arrangement functions in a manner well known in the art. The electrical coupling is established by locating the lighting unit 606 adjacent the generator unit 604 as shown by arrows "X" on FIG. 6. Other arrangements are envisaged and are within the scope of the present invention such as a traditional plug and socket (charge conducted by contact, for example trough metallic connections). The lighting unit is secured to the generator unit 604 by securing clips (not shown).

It will be appreciated by one skilled in the art that any of the electrically powered devices as described herein may be attached to the generator unit 604. Further, a generator unit as described above may have a plurality of plug arrangements to allow more than one electrically powered device to be fitted therewith. In an alternative embodiment, the electrically powered device module may allow further devices to be attached to it. For example, a temperature probe module may be fitted to (and draw electrical charge from) an adjacent lighting module, which may in turn be fitted to (and draw electrical charge from) a generator unit, such as the generator unit 604.

It will also be appreciated that the manner of exhausting the water from the generator unit as shown in FIG. 6 could be altered to direct it through an adjacent electrically controlled device unit. For example, in the case where the electrically controlled device is a water treatment device (an ioniser, for example). Further, the electrically controlled device unit may be removably attachable to the front of the generator unit, or at any point around the periphery.

It will be appreciated, as discussed above, that the generator may be used to power other swimming pool devices such as an ioniser, heating element, cooling element etc.

The generator may be controlled by means of a remote control unit, such as an infra red or radio frequency controller. The generator may also have timing functions to allow a user to set the time at which the electrically powered item turns on/off. The generator may also comprise light detection means, such as an LDR. The light detection means may be local to the generator, ie. located within the housing thereof, or may be remote ie. thereby operable to detect the light conditions at the surface of the pool, rather than at a submerged position.

A generator according to the present invention is easy to install to an existing insert and thus requires little or no modification to existing pool inlets to fit. Further, the device negates the need to supply cables to submerged pool apparatus, such as lights. This represents a beneficial safety feature as well as a saving of time and money. The generator of the present invention provides a self contained submergible electrically powered device having an integral means of power generation which is economically and environmentally favourable.

It will be apparent to a person skilled in the art that the swimming pool water inlet generator could be used for pools (indoor or outdoor), spas, lakes or fountains, all being within the scope of the present invention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A swimming pool water inlet generator comprising attachment means operable to allow the generator to be attached to a swimming pool water inlet, a turbine assembly arranged and operable to generate electricity when water flows through the inlet and at least one electrically powered device operable to use the generated electricity in an operation thereof, wherein the turbine assembly comprises a rotatable rotor, which rotor is arranged and operable, in use, to divert water flowing over the rotor, such that water hits the rotor generally axially with regard to the axis of rotation of the rotor and is deflected such that it exists the rotor generally radially with regard to the axis of rotation of the rotor.

2. A swimming pool water inlet generator according to claim 1, wherein the attachment means is operable to allow the generator to attach to an insert of the swimming pool water inlet.

3. A swimming pool water inlet generator according to either of claim 1 or claim 2, wherein the attachment means comprises a threaded region operable to threadedly engage with a threaded region of the swimming pool water inlet.

4. A swimming pool water inlet generator according to claim 1, wherein the generator further comprise locking means operable to allow the generator to be locked in position with respect to the swimming pool water inlet.

5. A swimming pool water inlet generator according to claim 1, wherein the rotor, is arranged to rotate when water flows through the swimming pool water inlet.

6. A swimming pool water inlet generator according to claim 5, wherein the axis of rotation of the rotor is parallel with the direction of flow of the water through the swimming pool water inlet.

7. A swimming pool water inlet generator according to claim 5, wherein the rotor is generally conical, having an apex thereof extending into the swimming pool water inlet.

8. A swimming pool water inlet generator according to claim 5, wherein the turbine assembly comprises a braking system which is operable to allow the rotor to be locked in position and thus rotation thereof to be prevented.

9. A swimming pool water inlet generator according to claim 5, wherein the turbine assembly comprises a static portion, upon which may be situated one or more stators.

10. A swimming pool water inlet generator according to claim 9, wherein the static portion further comprises one or more electronic components associated with the turbine assembly, the electronic components being selected from the group consisting of one or more of batteries, battery control units, generator control units, and master control units.

11. A swimming pool water inlet generator according to claim 9 wherein the static portion is generally water tight.

12. A swimming pool water inlet generator according to claim 9, wherein the at least one electrically powered device is fitted to the static portion of the turbine assembly.

13. A swimming pool water inlet generator according to claim 9, wherein the electrically powered device is selected from one or more of the following: a light source; an ionizer; a water heating element; a water cooling element.

14. A swimming pool water inlet generator according to claim 13, wherein the electrically powered device comprises a light source, the light source selected from the group consisting of an LED or an array of LEDs.

15. A swimming pool water inlet generator according to claim 13, which comprises one or more status indicators.

16. A swimming pool water inlet generator according to claim 13, which comprises a cover portion that may be transparent, translucent or opaque.

17. A swimming pool water inlet generator according to claim 13, which comprises signal detecting means operable to detect a signal from a remote control device.

18. A swimming pool water inlet generator according to claim 13, which comprises light detection means operable to detect levels of light at or around the generator.

19. A swimming pool water inlet generator according to claim 18, wherein the light detection means is arranged to cause the operation of one or more of the electronically powered devices depending on the detected light levels.

20. A swimming pool water inlet generator according to claim 18, which comprises switching means operable to switch the or each electrically powered device between an on and off position.

21. A swimming pool water inlet generator according to claim 20, wherein the switching means comprises a timer that allows the or each (separately or together) electrically powered devices to be switched on or off at a predetermined time.

22. A swimming pool water inlet generator according to claim 1 wherein the generator comprises flow restriction means, arranged to restrict the flow of fluid through the inlet, whereby the flow restriction means are adjustable to thereby allow adjustment of the restriction of the flow of fluid through the inlet.

* * * * *

UNITED STATES PATENT AND TRADEMARK OFFICE
CERTIFICATE OF CORRECTION

PATENT NO. : 8,618,687 B2
APPLICATION NO. : 12/918387
DATED : December 31, 2013
INVENTOR(S) : Douglas Burnham It is certified that error appears in the above-identified patent and that said Letters Patent is hereby corrected as shown below:

In the Claims

In column 9, Line 6, claim 1, the word exists should read exits.

Signed and Sealed this
Fifteenth Day of July, 2014

Michelle K. Lee
*Deputy Director of the United States Patent and Trademark Office*